United States Patent [19]
Scheim et al.

[11] Patent Number: 6,001,948
[45] Date of Patent: *Dec. 14, 1999

[54] ALKOXY-CROSSLINKING RTV1 SILICONE RUBBER MIXTURES

[75] Inventors: Uwe Scheim; Uwe Bankwitz, both of Coswig; Robert Lehnert, Dresden; Peter Jenkner, Rheinfelden, all of Germany

[73] Assignee: Wacker-Chemie GmbH, Munich, Germany

[ * ] Notice: This patent is subject to a terminal disclaimer.

[21] Appl. No.: 09/093,773

[22] Filed: Jun. 9, 1998

[30] Foreign Application Priority Data

Jun. 17, 1997 [DE] Germany ............................ 197 25 501

[51] Int. Cl.$^6$ .................................................... C08G 77/26
[52] U.S. Cl. ................................................................ 528/34
[58] Field of Search .................................................. 528/34

[56] References Cited

U.S. PATENT DOCUMENTS

| | | | |
|---|---|---|---|
| 4,036,813 | 7/1977 | Hardman et al. | 528/34 |
| 4,460,739 | 7/1984 | Ashby | 524/702 |
| 4,788,310 | 11/1988 | Stein et al. | 556/419 |
| 4,889,942 | 12/1989 | Gutek et al. | 556/419 |
| 4,985,476 | 1/1991 | Endres et al. | 523/210 |
| 5,409,963 | 4/1995 | Takeoka | 522/31 |
| 5,741,839 | 4/1998 | Scheim | 524/188 |

FOREIGN PATENT DOCUMENTS 42 10 349 A1  10/1993  Germany .

*Primary Examiner*—Margaret G. Moore
*Attorney, Agent, or Firm*—Oblon, Spivak, McClelland, Maier & Neustadt, P.C.

[57] ABSTRACT

The invention relates to alkoxy-crosslinking RTV1 silicone rubber mixtures based on hydroxy-terminated polydiorganosiloxanes containing a trialkoxysilane with a substituted amidoalkyl radical, which can be prepared using conventional mixing technologies. The novel RTV1 silicone rubber mixtures cure rapidly and without tack to give products with good mechanical properties. The shelf-life of the mixtures is excellent. One particular advantage of this invention is that it is also possible to create systems in which crosslinking produces only elimination products which are completely free from toxic methanol.

19 Claims, No Drawings

ALKOXY-CROSSLINKING RTV1 SILICONE RUBBER MIXTURES

BACKGROUND OF THE INVENTION

1. Field of the Invention

The invention relates to alkoxy-crosslinking RTV1 silicone rubber mixtures based on hydroxy-terminated polyorganosiloxanes containing a trialkoxysilane with a substituted amidoalkyl radical.

2. Discussion of the Background

One-component silicone rubber mixtures (RTV1) which can be stored if water is excluded and which in the presence of water vulcanize at room temperature to give elastomers are known. The vulcanization of the mixtures may take place under conditions which are acidic, e.g. in the presence of acetoxysilanes, basic, e.g. using aminosilanes, or neutral, e.g. by means of compounds which have oximo or alkoxy groups. RTV1 systems which crosslink under neutral conditions are needed especially in circumstances where the elimination products produced when the mixtures are cured should not affect the substrate, for example in the jointing of concrete or of metallic materials.

RTV1 materials containing acetate-, amine- and oxime-crosslinking agents are typically prepared by mixing an OH-terminated polydimethylsiloxane with a plasticizer, which is usually a methyl-terminated polydimethylsiloxane, an acetoxy-, amino- or oximosilane as a crosslinking agent, an active filler, for example fine-particle silica, and a catalyst, which is usually a dialkyltin compound, in the order stated. Additives, such as curing accelerators, pigments, processing aids and other fillers, may be added. Except for a few very specific applications which require flowable compositions, the requirement is mainly for mixtures of firm consistency which contain only fine-particle silica as filler. The mixing systems used for RTV1 materials are usually simple planetary mixers or dissolvers. There are also processes which allow continuous preparation of the mixture, e.g. using extruders. In the case of alkoxy-crosslinking RTV1 compositions, however, it is not possible to use OH-terminated polydimethylsiloxane other than in a few exceptional cases. If the components are mixed in the manner described above, using an alkoxysilane as crosslinking agent, vulcanization begins as early as during the preparation of the mixture. For this type of RTV1 mixture, a polymer is first prepared separately in a preliminary step by reacting hydroxy-terminated polydiorganosiloxanes with alkoxysilanes in the presence of catalysts (EP 1376 883, EP 304 701, EP 559 045 and many others). The alkoxysilane used is usually methyltrimethoxysilane. There are also known processes in which compounds such as aminopropyltrimethoxysiloxane, aminoethylaminopropyltrimethoxysilane, glycidoxypropyltrimethoxysilane and methacryloxypropyltrimethoxysilane are employed (DE 44 05 851). The preparation of the mixture then follows the preparation of the alkoxy-endgroup polymer, and takes place as described above. The separate preparation of the specific polymer, however, is inconvenient and requires additional expense.

Attempts are therefor being made to use the readily obtainable hydroxy-terminated polydiorganosiloxanes directly as polymers in the preparation of alkoxy-crosslinking RTV1 compositions. For example, EP 384 609 and EP 543 615 describe methoxy-crosslinking compositions which are mixed with a very large amount of filler and have been prepared using OH-terminated polydimethylsiloxanes. However, this method functions only where the polymer, the plasticizer and the fillers (in this case a combination of precipitated and ground chalk) are first mixed with one another, and then methyltrimethoxy-siloxane, as a crosslinking agent, and a crosslinking catalyst are added afterward. This initially gives a material which has an extremely high viscosity and may even be to some extent elastomeric, and which can only be processed using specific mixing technologies. The mixing technology normally used for RTV1 compositions, e.g. planetary mixers and dissolvers, cannot be used. In addition, this procedure is limited to highly filled methoxy-crosslinking compositions. If the ethoxysilanes which have been described hitherto are used, premature crosslinking takes place as early as during the mixing or during the storage of the finished pastes and thus the products obtained are not sufficiently storage-stable. For transparent systems filled only with fine-particle silica, this method cannot be used at all. It is known that mixing of OH-end-group polymer with silica, without a crosslinking agent, gives a very highly viscous paste, which rapidly stiffens to give a hard crumbly material. When a crosslinking agent is added to a mixture of this type, the firm consistency of the paste is lost. However it is just such firm-consistency compositions which are needed. In addition, the premature crosslinking of compositions prepared in accordance with the prior art described above cannot be controlled.

Because of the toxicity of methanol, it is moreover desirable to be able to prepare alkoxy-crosslinking RTV1 compositions which produce only non-hazardous elimination products, e.g. ethanol.

SUMMARY OF THE INVENTION

Accordingly, one object of this invention is to provide alkoxy-crosslinking RTV1 silicone rubber mixtures for which it is not a necessary to prepare the alkoxy-terminated polymers in a previous step. It is also an object to be able to prepare compositions containing OH-end-group polymers using the mixing technologies which are conventionally used for RTV1 compositions. In particular, this invention enables the preparation of transparent alkoxy-crosslinking RTV1 pastes of firm consistency.

The invention provides alkoxy-crosslinking RTV1 silicone rubber mixtures comprising: (a) at least one hydroxy-terminated polydiorganosiloxane of the general formula (I)

where $R^1$, independently of one another, are unsubstituted or substituted alkyl and/or alkenyl and/or aryl radicals, preferably methyl, and n is from 20 to 2000, preferably from 100 to 1600, and (b) at least one alkoxysilane and/or its partial hydrolyzate of the general formula (II)

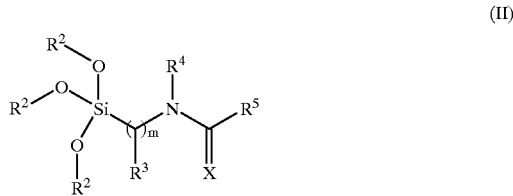

where $R^2$, independently of one another, are unsubstituted and/or substituted alkyl and/or silyl radicals, $R^3$, independently of one another, are unsubstituted and/or substituted, saturated and/or unsaturated alkyl and/or aryl radicals and/or hydrogen, $R^4$ are unsubstituted or substituted, saturated or unsaturated alkyl, aryl or acyl radicals or hydrogen, $R^5$ are unsubstituted or substituted, saturated or unsaturated alkyl or aryl radicals or hydrogen, X is oxygen or sulfur, the radicals R4 and R5 may form alicyclic or heterocyclic rings, and m is either 1 or 2; and (c) at least one organosilane and/or its partial hydrolyzate of the general formula (III)

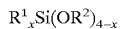  (III)

where $R^1$ and $R^2$ are as defined above and x is either 0 or 1.

DESCRIPTION OF THE PREFERRED EMBODIMENTS

The hydroxy-terminated polydiorganosiloxanes of the general formula (I) are known. They are usually prepared by polymerizing cyclic siloxanes in the presence of strongly basic catalysts and small amounts of water, or by polycondensing short-chain linear oligomers with OH end groups. Since, however, the starting compounds used for the synthesis contain, besides the bifunctional units primarily desired, also tri- and tetrafunctional units, there are always compounds in the polymers which contain a branch, or even more than one branch, in the molecule. As the content of tri- or tetrafunctional units in the starting materials increases and the molecular weight of the polymer increases, the probability that the molecules will contain branching points also increases. Preferred substituents $R^5$ are methyl, ethyl, phenyl, vinyl and trifluoropropyl radicals. Because of their ready availability, particular preference is given to α,ʃ-dihydroxypolydimethylsiloxanes in which n in the formula (I) is from 100 to 1600. Although the use of purely linear polymers is preferred, it is also possible to use polymers of the type which contain branching points. The RTV1 silicone rubber mixture when ready for use usually contains from 30 to 90% by weight of poly-diorganosiloxanes of the general formula (I).

The alkoxysiloxanes of the general formula (II) may, for example, be compounds in which no silyl group is bonded as radical $R^2$, and/or partial hydrolyzates of these. Examples of such compounds are N-1-(triethoxysilyl)ethyl-2-pyrrolidone, N-2-(triethoxysilyl)ethyl-2-pyrrolidone, N-1-(triethoxysilyl)ethyl-N-methylacetamide, N-2-(triethoxysilyl)ethyl-N-methylacetamide and mixtures of these.

The alkoxysilanes of the general formula (II) may firthermore be the reaction products of alkoxysilanes of the general formula (II) which contain no silyl group, and/or of partial hydrolyzates of these, with organosilanes and/or partial hydrolyzates of these of the general formula (II), for example N-1-[(methyldiethoxysiloxy)diethoxysilyl]ethyl-2-pyrrolidone. An example of a partial hydrolyzate of alkoxysilanes of the general formula (II) is 1,3-bis(1'-N-methylacetamidoethyl)-1,1,3,3-tetraethoxydisiloxane. An example of a reaction product obtained by cohydrolysis of alkoxysilanes of the general formula (II) with organosilanes of the general formula (III) is 1-N-[(diethoxymethylsiloxy) diethoxysilyl]ethyl-2-pyrrolidone.

Other examples of alkoxysilanes of the general formula (II) are: N-1-(triethoxysilyl)ethylsuccinimide

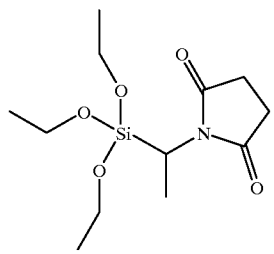

$R^2 = CH_2CH_3$, $R^3 = CH_3$, $R^4—R^5 = $ —$CO(CH_2)_2$—, X = O, m = 1

N-2(triethoxysilyl)ethylsuccinimide

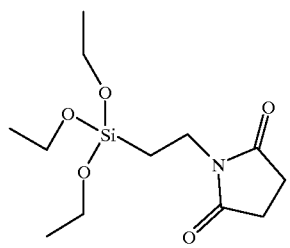

$R^2 = CH_2CH_3$, $R^3 = H$, $R^4—R^5 = $ —$CO(CH_2)_2$—, X = O, m = 2

N-1-(triethoxysilyl)ethylphthalimide

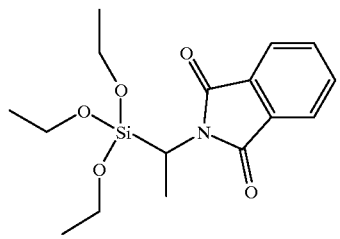

$R^2 = CH_2CH_3$, $R^3 = CH_3$, $R^4—R^5 = $ —$COC_6H_4$—, X = O, m = 1

N-2-(triethoxysilyl)ethylphthalimide

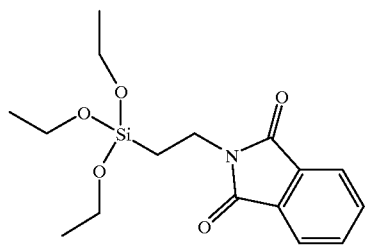

$R^2 = CH_2CH_3$, $R^3 = H$, $R^4—R^5 = $ —$COC_6H_4$—, X = O, m = 2

N-1-(trimethoxysilyl)ethyl-2-pyrrolidone

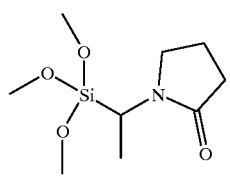

-continued $R^2 = R^3 = CH_3, R^4\text{—}R^5 = \text{——}(CH_2)_3\text{——}, X = O, m = 1$ N-2-(triinethoxysilyl)ethyl-2-pyrrolidone

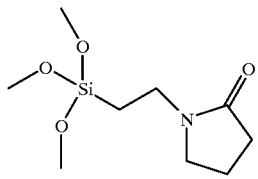

$R^2 = CH_3, R^3 = H, R^4\text{—}R^5 = \text{——}(CH_2)_3\text{——}, X = O, m = 2$ N-1-(tri-n-propoxysilyl)ethyl-N-methylacetamide

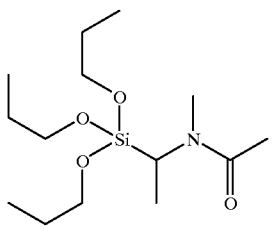

$R^2 = CH_2CH_2CH_3, R^3 = R^4 = R^5 = CH_3, X = O, m = 1$

N-2-(tri-n-propoxysilyl)ethyl-N-methylacetamide

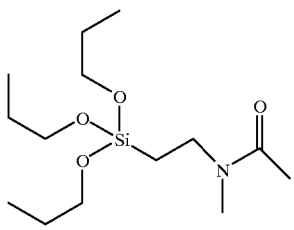

$R^2 = CH_2CH_2CH_3, R^3 = H, R^4 = R^5 = CH_3, X = O, m = 2$

N-1-(tris(2-methoxyethoxy)silyl)ethyl-N-methylthioacetamide

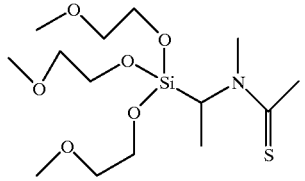

$R^2 = CH_2CH_2OCH_3, R^3\text{—}R^4 = R^5 = CH_3, X = S, m = 1$

N-2-(tris(2-methoxyethoxy)silyl)ethyl-N-methylthioacetamide

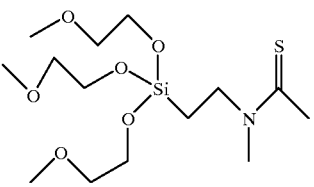

$R^2 = CH_2CH_2OCH_3, R^3 = H, R^4 = R^5 = CH_3, X = S, m = 2$

These compounds may also be used as mixtures.

The alkoxysilanes of the general formula (II) which are used according to the invention are obtained, for example, by an addition reaction of the corresponding trialkoxysilane with the corresponding N-vinyl-substituted amide.

The amount of the alkoxysilane of the general formula (II) to be used depends on the content of hydroxyl groups bonded to silicon in the poly-diorganosiloxane of the general formula (I) and can readily be adapted to the prevailing circumstances by the person skilled in the art. The alkoxysilane of the general formula (II) is preferably present in amounts of from 0.1 to 10% by weight, particularly preferably from 1 to 5% by weight, based on the entire mixture.

The organosilane and/or its partial hydrolyzate of the general formula (III) is usually present at up to 10% by weight as a crosslinking agent in the RTV1 silicone rubber mixture. Examples of such compounds are methyltrimethoxysilane, methyltriethoxysilane, vinyltriethoxysilane, tetraethoxy-silane, phenyltriethoxysilane, tetrakis(2-methoxy-ethoxy)silane, tetrakis(2-butoxy-ethoxy)silane, N-1-(triethoxysilyl)ethyl-2-pyrrolidone and N-1-(triethoxysilyl)ethyl-N-methylacetamide, and the mixtures, produced in the synthesis of the two last-named products, e.g., N-1-(triethoxysilyl) ethyl amide and N-2-(triethoxysilyl)ethyl amide. It is also possible to use any desired mixtures of the compounds mentioned.

Other constituents which may be added to the RTV1 mixtures are:

(d) up to 40% by weight of plasticizers, preferably trimethylsilyl-terminated polydimethylsiloxanes with viscosities of from 0.05 to 10 Pas, more preferably from 0.1 to 1 Pas. However, it is also possible to use methyl-terminated polydimethyl-siloxanes in which some of the methyl groups are replaced by other organic groups, such as phenyl, vinyl or trifluoropropyl. Although particular preference is given to the use of linear trimethylsilyl-terminated polydimethylsiloxanes as plasticizers, it is also possible to use compounds which contain some branching points, which are produced as a result of the presence of small amounts of tri- or tetra-functional silanes in the starting materials for preparing the plasticizers. Instead of these siloxanes, however, it is also possible for the plasticizer used to be up to 25% by weight, based on the entire mixture, of other organic compounds, e.g. aromatic-free hydrocarbon mixtures;

(e) from 0.01 to 5% by weight of a catalyst, in order to achieve a sufficiently high rate of crosslinking. Usual catalysts are dialkyltin compounds, e.g. dibutyltin dilaurate or diacetate, and/or titanium compounds, such as tetrabutyl or tetraisopropyl titanate or titanium chelates. It is also possible to use catalyst mixtures;

(f) up to 30% by weight of reinforcing fillers and/or up to 60% by weight of non-reinforcing fillers, to achieve certain mechanical properties. Preferred fillers with high specific surface area are fumed silica or precipitated calcium carbonate. It is also possible to use fillers with low specific surface area as extenders, ground calcium carbonate being preferred.

(g) up to 2% by weight of coupling agents, preferably alkoxysilanes substituted with functional groups. Particular preference is given to 3-aminopropyltriethoxysiloxane, 3-(2-aminoethyl)arninopropyltriethoxysilane and 3-mercaptopropyltriethoxysilane. It is also possible to use a mixture of alkoxysilanes substituted with functional groups; and (h) other additives, such as color pigments and fungicides (up to 2% by weight in each case).

The mixture may be prepared continuously or in batches, by known processes. Surprisingly, it has been found that the hydroxy-terminated poly-diorganosiloxanes (a) can be mixed with the other constituents (c) to (h) in the presence of the alkoxysilanes (b) without the occurrence of premature crosslinking, making the RTV1 mixture unusable, during the preparation of the mixture. At no time does the viscosity of the mixture increase in a way which requires the use of specialized mixing systems. The mixers used may be the same as those widely used for preparing other RTV1 systems. Products which are transparent, of firm consistency, or highly filled, may be prepared without difficulty.

The novel RTV1 silicone rubber mixtures cure rapidly and without tack, to give products with good mechanical properties. The shelf life of the mixtures is excellent. One particular advantage is that it now becomes possible to create systems whose crosslinking produces only elimination products which are completely free from toxic methanol.

Having generally described this invention, a further understanding can be obtained by reference to certain specific examples which are provided herein for purposes of illustration only and are not intended to be limiting unless otherwise specified.

EXAMPLES:

Example 1

1086 g of an α,ω-dihydroxypolydimethylsiloxane with a viscosity of 50 Pas and 18 g of N-1-(triethoxysilyl)ethyl-2-pyrrolidone were mixed homogeneously in a planetary mixer and admixed in succession with 850 g of a trimethylsilyl-termrnated polydimethylsiloxane with a viscosity of 100 mPas, 91 g of methyltrimethoxysilane, 40 g of bis(acetoacetato) diisobutyl titanate and 325 g of a fumed silica hydrophobicized with hexamethyldisilazane and have a specific surface area of about 200 $m^2/g$. The components were then mixed for 20 min at a reduced pressure of about 20 mbar. The mixture obtained in this manner cured within 7 days at 23° C. and 50% relative humidity to give a vulcanizate whose properties are shown in Table 1.

Example 2

1378 g of an α,ω-dihydroxypolydimethylsiloxane with a viscosity of 50 Pas and 22 g of N-1-(triethoxysilyl)ethyl-2-pyrrolidone were mixed homogeneously in a planetary mixer and admixed in succession with 600 g of a trimethylsilyl-terminated polydimethylsiloxane with a viscosity of 100 mPas, 91 g of methyltrimethoxysilane, 60 g of bis(acetoacetato) diisobutyl titanate, 200 g of a fumed silica having a specific surface area of about 150 $m^2/g$ and 2400 g of a ground chalk treated with stearic acid. The components were then mixed for 20 min at a reduced pressure of about 20 mbar. The mixture obtained in this manner cured within 7 days at 23° C. and 50% relative humidity to give a vulcanizate whose properties are shown in Table 1.

Example 3

1079 g of an α,ω-dihydroxypolydimethylsiloxane with a viscosity of 50 Pas and 25 g of N-1-(triethoxysilyl)ethyl-N-acetamide were mixed homogeneously in a planetary mixer and admixed in succession with 850 g of a trimethylsilyl-terminated polydimethylsiloxane with a viscosity of 100 mPas, 91 g of methyltrimethoxysilane, 40 g of bis(acetoacetato) diisobutyl titanate and 325 g of a fumed silica hydrophobicized with hexamethyldisilazane and have a specific surface area of about 200 $m^2/g$. The components were then mixed for 20 min at a reduced pressure of about 20 mbar. The mixture obtained in this manner cured within 7 days at 23° C. and 50% relative humidity to give a vulcanizate whose properties are shown in Table 1.

Example 4

1382 g of an α,ω-dihydroxypolydimethylsiloxane with a viscosity of 50 Pas and 18 g of N-1-(triethoxysilyl)ethyl-2-pyrrolidone were mixed homogeneously in a planetary mixer and admixed in succession with 600 g of a trirethylsilyl-terminated polydimethylsiloxane with a viscosity of 100 mPas, 90 g of tetraethoxysilane, 60 g of bis(acetoacetato) diisobutyl titanate, 150 g of a fumed silica having a specific surface area of about 150 $m^2/g$ and 2400 g of a ground chalk treated with stearic acid. The components were then mixed for 20 min at a reduced pressure of about 20 mbar. The mixture obtained in this manner cured within 7 days at 23° C. and 50% relative humidity to give a vulcanizaie whose properties are shown in Table 1.

Example 5

560 g of an α,ω-dihydroxypolydimethylsiloxane with a viscosity of 50 Pas, 240 g of a trimethylsilyl-terminated polydimethylsiloxane with a viscosity of 100 mPas and 8 g of N-1-(triethoxysilyl)ethyl-N-methylacetamide were homogeneously mixed in a dissolver and admixed in succession with 36 g of methyltrimethoxysilane, 80 g of a fumed silica with a specific surface area of about 150 $m^2/g$ and 7.5 g of tetraisopropyl titanate. The components were then mixed for 20 min at a reduced pressure of about 20 mbar. The mixture obtained in this manner cured within 7 days at 23° C. and 50% relative humidity to give a vulcanizate whose properties are shown in Table 1.

Example 6

A mixture of 11.8 g of methyltrimethoxysilane and 14.9 g of N-1-(triethoxysilyl)ethyl-N-methylacetamide was mixed with 1.1 g of water in 10 ml of ethanol. After 24 hours, the resultant product was distilled off together wit the ethanol added as solvent. The residue was 20.5 g of an oligomeric hydrolysate which was composed of 34% by weight of methyltrimethoxysilane, 8% by weight of N-1-(triethoxysilyl)ethyl-N-methylacetamide, 27% by weight of N-1-[(diethoxymethylsiloxy)diethoxysilyl]ethyl-N-methylacetamide, 8% by weight of 1,3-bis(1'-(N-methylacet-amido)ethyl-1,1,3,3-tetraethoxydisiloxane and 23% by weight of higher oligomeric hydrolysis/condensation products of N-1-(triethoxysilyl)ethyl-N-methylacetamide. The make-up of the mixture was determined using $^{29}$Si-NMR spectroscopy. 100 g of an α,ω- dihydroxpolydimethyl-siloxane with a viscosity of 50 Pas and 20 g of the oligomeric hydrolysis/condensation product described above were then homogeneously mixed in a dissolver, and admixed in succession with 80 g of a triiethylsilyl-terminated polydimethylsiloxane with a viscosity of 100 mPas, 4 g of bis(acetoacetato) diisobutyl titanate and 30 g of a fumed silica hydrophobicized with hexamethyldisilazane and having a specific surface area of about 200 m²/g. The components were then mixed for 20 min under a reduced pressure of about 20 mbar. The mixture obtained in this manner cured within 7 days at 23° C. and 50% relative humidity to give a vulcanizate.

TABLE 1

| Property | Method | Ex. 1 | Ex. 2 | Ex. 3 | Ex. 4 | Ex. 5 |
|---|---|---|---|---|---|---|
| Skin Formation Time [min] | | 35 | 10 | 20 | 10 | 5 |
| Tensile Strength [MPa] | DIN 53504 S2 | 1.67 | 1.00 | 1.50 | 0.69 | 1.12 |
| Elongation at Break [%] | DIN 53504 S2 | 713 | 564 | 680 | 214 | 700 |
| Tension at 100% Elongation [MPa] | DIN 53504 S2 | 0.33 | 0.53 | 0.34 | 0.58 | 0.30 |
| Shore A Hardness | DIN 53505 | 17 | 28 | 18 | 24 | 18 |

The skin formation time was measured immediately after preparation of the product. The mechanical parameters (tensile strength, elongation at break, tension at 100% elongation and hardness) were determined after curing for 7 days at 23° C. and 50% relative humidity.

Having now fully described the invention, it will be apparent to one of ordinary skill in the art that many changes and modifications can be made thereto without departing from the spirit or scope of the invention as set forth herein.

German patent application P 197 25 501.9, filed Jun., 17, 1997, and from which this application claims priority, is incorporated by reference herein.

What is claimed is:

1. A crosslinking RTV1 silicone rubber mixture comprising:

(a) at least one hydroxy-terminated polydiorganosiloxane of the formula (I);

and the reaction product of (b) at least one alkoxysilane of the formula (II) and/or a partial hydrolyzate thereof;

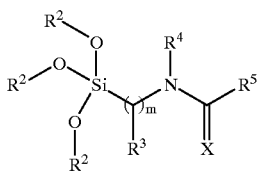

and (c) at least one organosilane of the formula (III) and/or a partial hydrolyzate thereof

where $R^1$, independently of one another, are unsubstituted and/or substituted alkyl, alkenyl or aryl radicals, $R^2$, independently of one another, are unsubstituted and/or substituted alkyl and/or silyl radicals, $R^3$, independently of one another, are unsubstituted and/or substituted, saturated and/or unsaturated alkyl and/or aryl radicals and/or hydrogen, $R^4$ are unsubstituted or substituted, saturated or unsaturated alkyl aryl or acyl radicals or hydrogen, $R^5$ are saturated alkyl or aryl radicals or hydrogen, and wherein the radicals $R^4$ and $R^5$ may form alicyclic or heterocyclic rings, X is oxygen or sulfur, m is either 1 or 2, n is from 20 to 2000, and x is either 0 or 1.

2. A crosslinking RTV1 silicone rubber mixture as claimed in claim 1, wherein in the formula (I), $R^1$ is methyl and n is from 100 to 1600.

3. A crosslinking RTV1 silicone rubber mixture as claimed in claim 1, wherein the alkoxysilane of formula (II) or its partial hydrolyzate are compounds which have no silyl groups bonded as radical $R^2$.

4. A crosslinking RTV1 silicone rubber mixture as claimed in claim 1, wherein the alkoxysilane of formula (II) is N-1-(triethoxysilyl)ethyl-2-pyrrolidone or N-2 (triethoxysilyl)ethyl-2-pyrrolidone or mixtures thereof.

5. A crosslinking RTV1 silicone rubber mixture as claimed in claim 1, wherein the alkoxysilane of formula (II) is N-1-(triethoxysilyl)-ethyl-N-methylacetamide or N-2-(triethoxysilyl)-ethyl-N-methylacetamide or mixtures thereof.

6. A crosslinking RTV1 silicone rubber mixture as claimed in claim 1, wherein the organosilanes of formula (III) is an organotriethoxysilane and/or tetraethoxysilane.

7. A crosslinking RTV1 silicone rubber mixture as claimed in claim 1, wherein (b) is N-1-[(methyldiethoxy-siloxy)diethoxysilyl]ethyl-2-pyrrolidone.

8. A crosslinking RTV1 silicone rubber mixture as claimed in claim 1, wherein the alkoxysilane of formula (II) and/or partial hydrolyzates thereof is present in an amount of from 0.1 to 10% by weight, based on the polydiorganosiloxane of formula (I).

9. A crosslinking RTV1 silicone rubber mixture as claimed in claim 1, wherein the hydroxy-terminated polydiorganosiloxane of formula (I) is an α,ω-dihydroxypolydimethylsiloxane.

10. A crosslinking RTV1 silicone rubber mixture as claimed in claim 1, further comprising a plasticizer.

11. A crosslinking RTV1 silicone rubber mixture as claimed in claim 10, wherein said plasticizer is a methyl-terminated polydimethylsiloxane.

12. A silicone rubber comprised of the RTV1 silicone rubber mixture as claimed in claim 1, wherein said mixture has been cured.

13. A process for preparing an alkoxy-crosslinking RTV 1 silicone rubber mixture comprising mixing:

(a) at least one hydroxy-terminated polydiorganosiloxane of the formula (I); and

and the reaction product of (b) at least one alkoxysilane of the formula (II) or a partial hydrolyzate thereof;

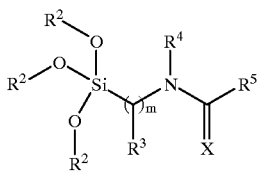
(II)

and (c) at least one organosilane of the formula (III) and/or a partial hydrolyzate thereof

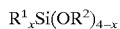
(III)

where $R^1$, independently of one another, are unsubstituted and/or substituted alkyl, alkenyl or aryl radicals, $R^2$, independently of one another, are unsubstituted and/or substituted alkyl and/or silyl radicals, $R^3$, independently of one another, are unsubstituted and/or substituted, saturated and/or unsaturated alkyl and/or aryl radicals and/or hydrogen, $R^4$, are unsubstituted or substituted, saturated or unsaturated alkyl, aryl or acyl radicals or hydrogen, $R^5$ are saturated alkyl or aryl radicals or hydrogen, and wherein the radicals $R^4$ and $R^5$ may form alicyclic or heterocyclic rings, X is oxygen or sulfur, m is either 1 or 2, n is from 20 to 2000, and x is either 0 or 1.

14. The process as claimed in claim 13, wherein a plasticizer is added to the mixture.

15. The process as claimed in claim 14, wherein the plasticizer is a methyl-terminated polydimethylsiloxane.

16. A process for preparing a silicone rubber comprising mixing:

(a) at least one hydroxy-terminated polydiorganosiloxane of the formula (I); and

(I)

and the reaction product of (b) at least one alkoxysilane of the formula (II) and/or partial hydrolyzate thereof;

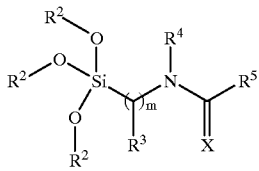
(II)

and (c) at least one organosilane of the formula (III) and/or partial hydrolyzate thereof

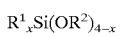
(III)

where $R^1$, independently of one another, are unsubstituted and/or substituted alkyl, alkenyl or aryl radicals, $R^2$, independently of one another, are unsubstituted and/or substituted alkyl and/or silyl radicals, $R^3$, independently of one another, are unsubstituted and/or substituted, saturated and/or unsaturated alkyl and/or aryl radicals and/or hydrogen, $R^4$, are unsubstituted or substituted, saturated or unsaturated alkyl, aryl or acyl radicals or hydrogen, $R^5$ are saturated alkyl or aryl radicals or hydrogen, and wherein the radicals $R^4$ and $R^5$ may form alicyclic or heterocyclic rings, X is oxygen or sulfur, m is either 1 or 2, n is from 20 to 2000, and x is either 0 or 1, thereto, and then curing the mixture to form a rubber.

17. The process as claimed in claim 16, wherein said curing takes place within 7 days at 23° C. and 50% relative humidity.

18. The process as claimed in claim 16, wherein a plasticizer is added to the mixture.

19. The process as claimed in claim 18, wherein the plasticizer is a methyl-terminated polydimethylsiloxane.

* * * * *